No. 737,525. PATENTED AUG. 25, 1903.
J. SUMMERFIELD.
WATER HEATER.
APPLICATION FILED DEC. 22, 1902.
NO MODEL.

Witnesses:
J. W. Stitt
L. T. Knight

Inventor
John Summerfield,
By A. L. Jackson,
Attorney.

No. 737,525. Patented August 25, 1903.

UNITED STATES PATENT OFFICE.

JOHN SUMMERFIELD, OF DALLAS, TEXAS.

WATER-HEATER.

SPECIFICATION forming part of Letters Patent No. 737,525, dated August 25, 1903.

Application filed December 22, 1902. Serial No. 136,178. (No model.)

*To all whom it may concern:*

Be it known that I, JOHN SUMMERFIELD, a citizen of the United States, residing at Dallas, county of Dallas, and State of Texas, have invented a new and Improved Water-Heater, of which the following is a specification.

This invention relates to improvements in water-heaters; and the object is to provide heaters by which water for baths and other purposes may be heated in a very short time and which can be manufactured at small cost.

Another object and advantage is that the heaters will also furnish enough heat to warm a bath-room.

Other objects and advantages will be fully explained in the following description, and the invention will be more fully pointed out in the claims.

Reference is had to the accompanying drawings, which form a part of this application and specification.

Figure 1:
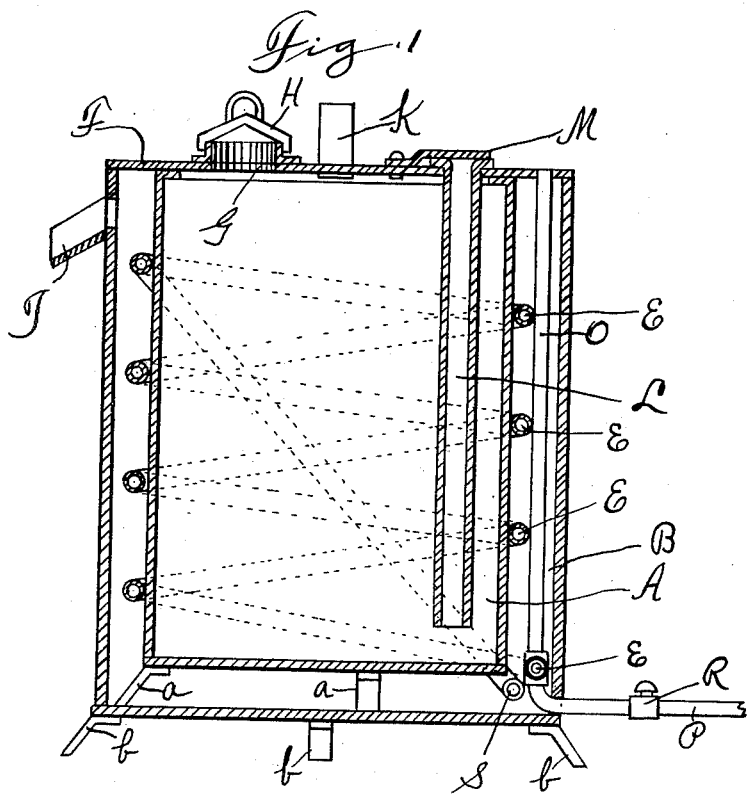
Figure 2:
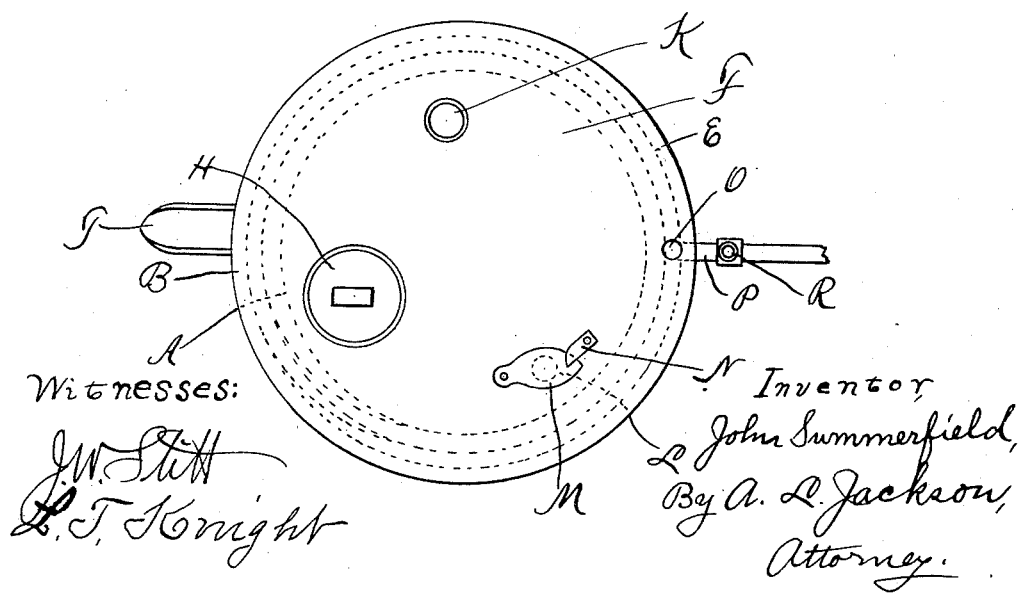

Figure 1 is a vertical section of the heater, showing the invention in detail. Fig. 2 is a plan view.

Similar characters of reference are used to indicate the same parts throughout both views.

This invention consists of a fire-box A, a water-tank B, and a pipe E for circulating the water throughout the water-tank. The heater and the tank are preferably cylindrical in form. The heater A is very large, the vessel A being termed a "heater" or a "fire-box," as compared with the amount of fuel that is required. The water-tank B circumscribes the heater A, and a pipe E is coiled several times around the heater inside of the tank B for circulating the water about the heater. One cover F serves for both the heater and the tank. The heater A is provided with an opening G for putting in fuel and for other purposes, which opening is closed by a cap H. A pipe connection K is made with the heater A for conveying away the smoke. Any suitable pipe may be connected with the connection K. The heater is provided with a draft-tube L, which tube is closed by a pivoted damper M. The damper M is held in close contact or flush with the cover F by means of a button or latch N. The tank may be supplied with water through a pipe O, which opens through the cover F, which pipe O is connected with the pipe E by a T connection D. The tank may also be filled with water by connecting the pipe E with water-works by means of a pipe P, which is provided with a cock R. The pipe P is connected to pipe E by means of the T connection D. Both pipes O and P can be permanently connected with the pipe E without interfering with each other or with the supplying of the tank with water. The pipe E is passed around the heater several times until it approaches the top part of the heater and is then brought back practically to the starting-point and discharges the water in the tank at S.

The tank B is provided with suitable legs *b*, and the heater or fire-box A is supported by legs *a*, which rest on the bottom of the tank B. Water is heated under the bottom of the heater as well as by the side walls.

The heater A is preferably constructed of copper.

The tank must be filled with water before a fire is started in the fire-box. The tank is filled with water through the pipes P and E or through pipes O and E. A fire is then started in the fire-box and the water cut off by cock R. As soon as the water is hot enough it may be forced out of the tank B through a spout or nozzle T by turning in more water by the cock R. As soon as the cold water is turned in by cock R the hot water will commence to run out the spout T. Before the cold water reaches the spout, the cold water having to pass through the pipe E and then rise up in the tank, it is heated by the heater A. Practically a continuous stream of hot water may be obtained in this manner. A very small quantity of fuel placed on the floor of the heater will heat the water in a very short time. The burning of the fuel may be regulated by the damper M, by which the draft-tube L may be opened or closed or partly closed at will.

The size and shape of the various parts may be varied without departing from my invention.

Having fully described my invention, what I claim as new, and desire to secure by Letters Patent, is—

1. A water-heater comprising a tank, a fire-box mounted in said tank, a water-pipe coiled about said fire-box within said tank, said pipe being adapted to circulate the water about said fire-box by ascending coils until the water reaches a point near the upper part of said fire-box and then to discharge the water in the lower part of said tank near the beginning of the coiling of said pipe, and suitable smoke and draft connections for said fire-box.

2. A water-heater comprising a tank, a fire-box mounted in said tank, a water-pipe coiled about said fire-box within said tank, said pipe being adapted to circulate the water about said fire-box by ascending coils until the water reaches a point near the upper part of said fire-box and then to discharge the water in the lower part of said tank near the beginning of the coiling of said pipe, and a common cover for said tank and fire-box having suitable openings therein for draft and smoke connections.

3. A water-heater comprising a tank, a fire-box mounted in said tank, a pipe, having suitable water connections, coiled about said fire-box within said tank, said pipe being adapted to circulate water about said fire-box by ascending coils until the water reaches a point near the upper part of said fire-box and then to discharge the water in the lower part of said tank near the beginning of the coiling of said pipe, a common cover for said fire-box and tank having suitable openings therethrough for supplying said box with fuel and for making smoke connection, and a draft-tube suspended in said cover and projecting near the bottom of said fire-box.

4. A water-heater comprising a fire-box provided with suitable smoke and draft connections, a water-tank circumscribing said fire-box, and means for circulating water about said fire-box and supplying said tank with water consisting of a pipe entering the upper part of said tank and extending to the lower part thereof, a pipe entering the lower part of said tank, a T-pipe to which said pipes are connected, and a pipe connected to said T-pipe and coiled about said fire-box in ascending coils to the upper part thereof and then bent back near said T-pipe.

In testimony whereof I set my hand, in the presence of two witnesses, this 15th day of December, 1902.

JOHN SUMMERFIELD.

Witnesses:
J. M. BEATIE,
R. E. GAHAGON.